United States Patent [19]

Kitazawa

[11] Patent Number: 5,144,504

[45] Date of Patent: Sep. 1, 1992

[54] METHOD OF CONTROLLING POSITIONING OF MAGNETIC HEAD OF DISK DRIVE UNIT AND DISK DRIVE UNIT EXECUTING SAME

[75] Inventor: Takamasa Kitazawa, Nagano, Japan

[73] Assignee: Fujitsu Limited, Kanagawa, Japan

[21] Appl. No.: 530,524

[22] Filed: May 30, 1990

[30] Foreign Application Priority Data

Jun. 2, 1989 [JP] Japan .................................. 1-141840

[51] Int. Cl.5 ............................................... G11B 5/55
[52] U.S. Cl. ................................ 360/78.04; 360/69; 360/75; 360/105
[58] Field of Search ................ 360/69, 71, 75, 103, 360/105, 106, 77.02, 78.04, 77.05

[56] References Cited

U.S. PATENT DOCUMENTS 4,782,406 11/1988 Shoji et al. .......................... 360/75

Primary Examiner—Aristotelis Psitos
Assistant Examiner—Steven R. Garland
Attorney, Agent, or Firm—Nikaido, Marmelstein, Murray & Oram

[57] ABSTRACT

A disk drive unit includes a servo head, a plurality of data magnetic heads, magnetic disks for receiving and storing information through these heads, a drive circuit and a revolution detecting circuit for rotating the magnetic disks at a constant speed, a servo control circuit for positioning these heads in accordance with servo information read from the disk, and first and second delay circuits. The first delay circuit is turned ON for a predetermined time when the speed of rotation reaches a predetermined speed, and the second delay circuit is turned ON for another predetermined time when the first delay circuit is turned OFF. When the second delay circuit is turned ON, the servo head and the magnetic heads are withdrawn to a contact start stop area, and further, the magnetic heads and the servo head can carry out read and write operations, and when the second delay circuit is turned OFF, the heads are positioned at a cylinder, whereby the power consumption for withdrawing the heads can be reduced.

6 Claims, 4 Drawing Sheets

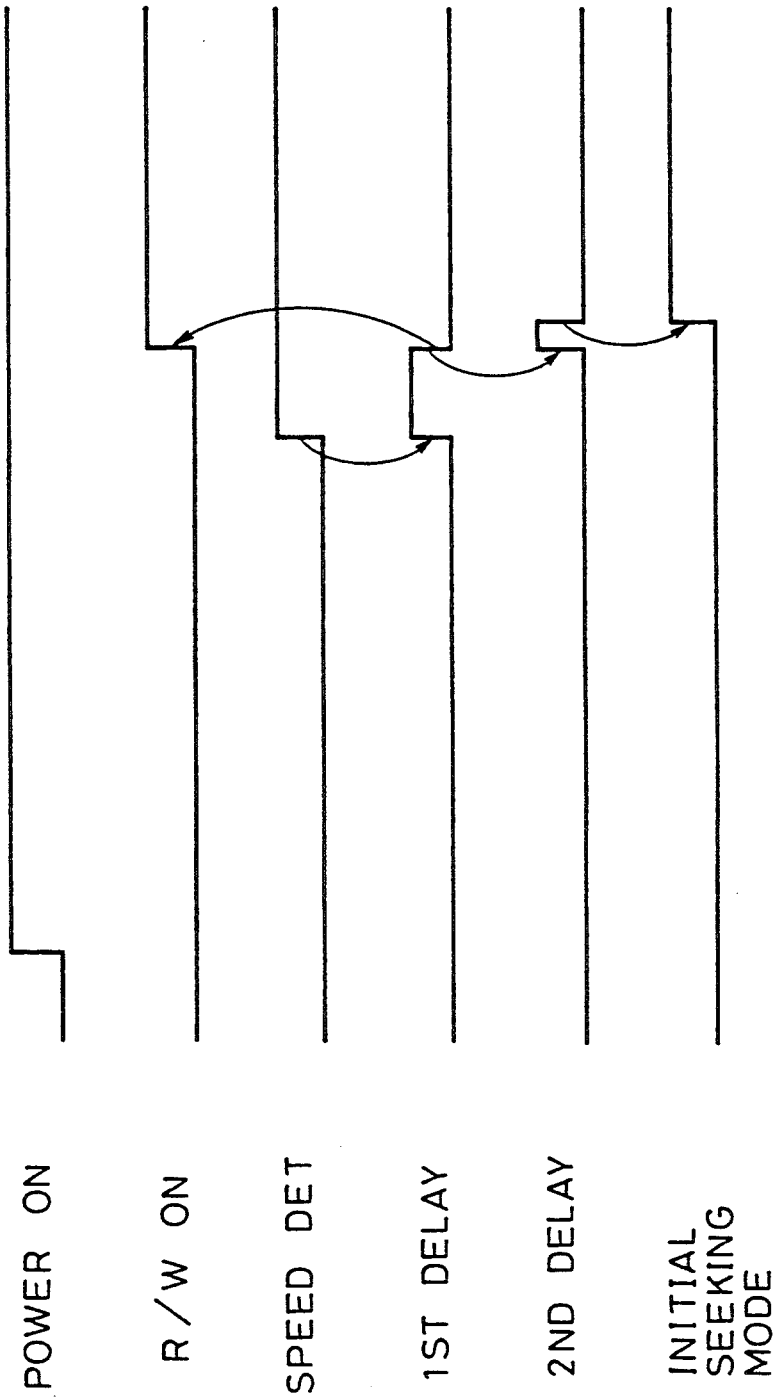

METHOD OF CONTROLLING POSITIONING OF MAGNETIC HEAD OF DISK DRIVE UNIT AND DISK DRIVE UNIT EXECUTING SAME

BACKGROUND OF THE INVENTION

1. Field of the Invention

The present invention relates to a disk drive unit, and more particularly to a method of controlling the positioning of a magnetic head of the disk drive unit and to the disk drive unit executing the same, whereby power consumption during the time from which the power is turned ON to the realization of the unit ready state can be shortened by controlling the positioning of the magnetic head of the disk drive unit.

2. Description of the Related Art

When the power supply thereto is turned ON, the magnetic disk drive unit starts to rotate a disk thereon, and when the rotation speed has reached a certain level, the magnetic head is made to float above the surface of the disk. When the power supply is turned OFF and the speed of rotation of the disk is reduced, the magnetic head is allowed to again come into contact with the surface of the disk.

Accordingly, because when the disk is first rotated the magnetic head is in contact with the surface of the disk, at that time the magnetic head is positioned at an evacuating area called a contact start stop (CSS) area, provided on the disk. Then, when the disk reaches a predetermined speed of rotation after the power supply thereto is turned ON, the magnetic head floating above the CSS area is initially moved to a position on a 0 cylinder corresponding to the outer most tracks of each disk, and when this positioning on the 0 cylinder is completed, the unit is in a ready state and waits for an instruction from a host apparatus.

If the unit is given a power OFF instruction while the magnetic head is positioned above the CSS area, when the power is turned OFF the rotation of the disk is stopped and thus the magnetic head is brought into contact with the CSS area. The above operation must be carried out to ensure that the magnetic head does not rub against the data storage areas of the disks. Note, data is not stored in the CSS areas.

After the power is turned ON and before the initial seeking movement thereof, if the magnetic head is moved from the CSS area to the data storage areas, the servo head approaches an area in which the servo information is stored and reads noise. If this noise is supplied to a seeking control circuit, the initial seeking movement of the magnetic head cannot be carried out in a normal manner. Further, since the servo head is in contact with the disk surface at the CSS area, when the rotation of the disk is started, the servo head is sometimes moved to the data storing area while rubbing against the disk surface, and thus the servo head frequently reads noise.

Therefore, the magnetic head must be positioned on the CSS area during the time from the turning ON of the power to the start of the initial seeking movement thereof. This positioning of the magnetic head as mentioned above increases the power consumption.

Namely, in a conventional unit, when the power supply to the magnetic disk drive unit is turned ON, since a motor driving a carriage is continuously supplied with electric current until just before the start of the initial seeking movement, a problem arises in that the power consumption is increased, and simultaneously, the temperature of the magnetic disk drive unit is elevated by heat radiated by a power amplification circuit or the like when the power ON or OFF operations for the magnetic disk drive unit are repeated.

SUMMARY OF THE INVENTION

An object of this invention is to provide a method of controlling the positioning of a magnetic head of the disk drive unit and the disk drive unit executing the same, wherein the power consumption can be reduced and the temperature of the disk drive unit can be kept lower until just before the start of the initial seeking movement carried out after the speed of rotation of the disk has reached a predetermined speed and is stabilized.

According to an aspect of this invention, there is provided a disk drive unit comprising at least one data magnetic head. A servo head is driven by the same carriage as the data magnetic head. A magnetic disk has information written thereto by the data magnetic head and from which information is read to the data magnetic head and the servo head. A revolution detecting device detects a speed of rotation of the magnetic disk. A drive device rotates the magnetic disk at a predetermined speed of rotation in response to the results of the detection by the revolution detecting device. A servo control device positions the data magnetic head on an arbitrary cylinder in response to servo information read from the magnetic disk by the servo head. A first delay is turned ON for a first predetermined time after the revolution detecting device has detected a predetermined speed of rotation of the disk. A second delay is turned ON for a second predetermined time after the first delay is turned OFF. A control device withdraws the data magnetic head and the servo head to evacuating area during the time for which the second delay is ON, controls the reading and writing operations by the data magnetic head and the servo head when the second delay is turned ON, and positions the data magnetic head on one cylinder after the second delay is turned OFF.

According to another aspect of this invention, there is provided a control method controlling a positioning of a magnetic head of a disk drive unit, comprising a revolution detecting device detecting a speed of rotation of a magnetic disk, a drive device for rotating the magnetic disk at a predetermined speed of rotation in response to results of a detection by the revolution detecting device, a servo head for reading servo information stored in the magnetic disk, and a servo control device positioning the servo head to an arbitrary cylinder in response to the servo information read by the servo head. The method comprising the steps of turning ON an output of a first delay for a first predetermined time, after a speed of rotation of the magnetic disk rotated by turning a power source ON reaches a predetermined speed of rotation; turning ON an output of a second delay for a second predetermined time after the first delay is turned OFF; withdrawing the servo head to an evacuating area during the time for which the output of the second delay is turned ON; reading the servo information by using the servo head; and positioning the servo head on an arbitrary cylinder after the output of the second delay is turned OFF.

BRIEF DESCRIPTION OF THE DRAWINGS

FIG. 4 is a time chart explaining an operation of the unit of FIG. 3.

DESCRIPTION OF THE PREFERRED EMBODIMENTS

Figure 1:
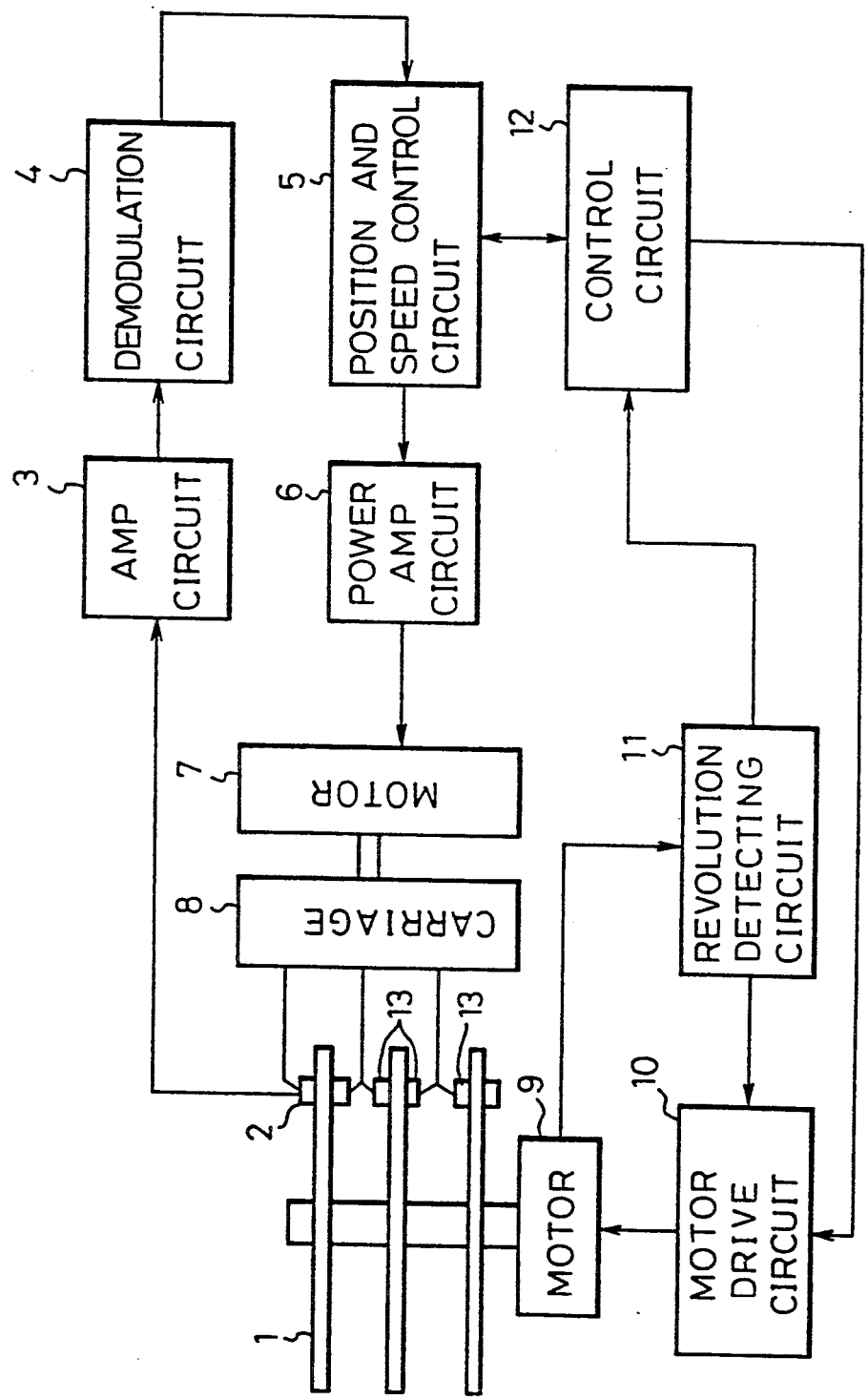
FIG. 1 is a block diagram of a conventional disk drive unit.

Prior to the explanation of the embodiments, a conventional unit is explained with reference to FIG. 1.

When power is supplied to a magnetic disk drive unit, a control circuit 12 controls a position and speed control circuit 5, a power amplification circuit 6 supplies electric power to a motor 7, the motor 7 moves a carriage 8, and a servo head 2 and data magnetic heads 13 are positioned on CSS areas provided on a disk 1. Namely, for example, the servo head 2 and the data magnetic head 13 are moved to a guide provided at a center of a disk. At this point, the servo head 2 and the plurality of data magnetic heads 13 are driven by the same carriage 8. In the unit, a plurality of disks are set on the same shaft, and one surface of the disks is used for the servo control.

The control circuit 12 instructs a motor drive circuit 10 to supply a motor 9 with electric current, to rotate the disk 1. Then the motor 9 outputs a signal denoting the speed of rotation of the motor 9, to a revolution detecting circuit 11, and thus the speed of rotation of the motor 9 is detected.

The detected speed of rotation of the motor 9 is fed back to the motor drive circuit 10, and accordingly, the speed of rotation of the motor 9 is controlled by the fedback signal. Namely, when the speed of rotation of the motor 9 is lower than a predetermined speed, electric current is supplied to the motor 9, and when the speed of rotation of the motor 9 is higher than the predetermined speed, the supply of the electric current is stopped.

When the motor 9 reaches the predetermined speed, the revolution detecting circuit 11 outputs a signal to the control circuit 12. Then after a certain time during which the rotation speed of the disk 1 is stabilized, the control circuit 12 controls the position and speed control circuit 5 to start an initial seeking movement of the heads 13.

The servo surface of the disk 1 on which the servo information is stored faces the servo head 2, and when the servo head 2 is moved from the CSS area to the servo information storing area, the servo head 2 reads the servo information stored on the servo surface and supplies the servo information to a demodulation circuit 4 through an amplification circuit 3. The servo information demodulated by the demodulation circuit 4 is supplied to the position and speed control circuit 5, the current position of the servo head 2 is detected from the servo information, and the detected data is supplied to the control circuit 12.

For example, the control circuit 12 calculates a distance from the current position of the servo head 2 to a servo track position corresponding to a 0 cylinder and outputs a signal, denoting the distance, to the position and speed control circuit 5, to position the magnetic heads on the 0 cylinder, i.e., the outer sides of the disks 1.

The position and speed control circuit 5 determines a target moving speed of the magnetic heads 13 in accordance with the above distance and supplies power to the motor 7 through the power amplification circuit 6, whereupon the motor 7 drives the carriage 8. A coarse control, by which the servo head 2 and the data magnetic head 13 are moved, is thus started.

The servo head 2 and plurality of data magnetic head 13 are attached to arms of the carriage 8, and thus the servo head 2 and the data magnetic heads 13 are simultaneously moved to the 0 cylinder position by the carriage 8.

The position and speed control circuit 5 detects speed of movement of the servo head 2 from an inclination angle of the servo signal detected when the servo head 2 crosses the servo track, controls the power amplification circuit 6 so that the speed of movement of the servo head 2 reaches the predetermined target speed, and then adjusts the power supplied to the motor 7.

When the servo head 2 approaches the target servo track, the position and speed control circuit 5 changes from the coarse control to a fine control, positions the servo head 2 precisely above the target servo track, and thereafter, controls the servo head 2 to follow the target servo track.

From the time of the power ON to the start of the initial seeking movement, the magnetic disk drive unit holds the magnetic head at the CSS area, and therefore, an electric current is continuously supplied to the motor 7 driving the carriage 8 for, for example, ten or so seconds.

When the magnetic heads are positioned at the 0 cylinder after the initial seeking movement is completed, the control circuit 12 outputs a ready state signal to a host unit.

Figure 2:
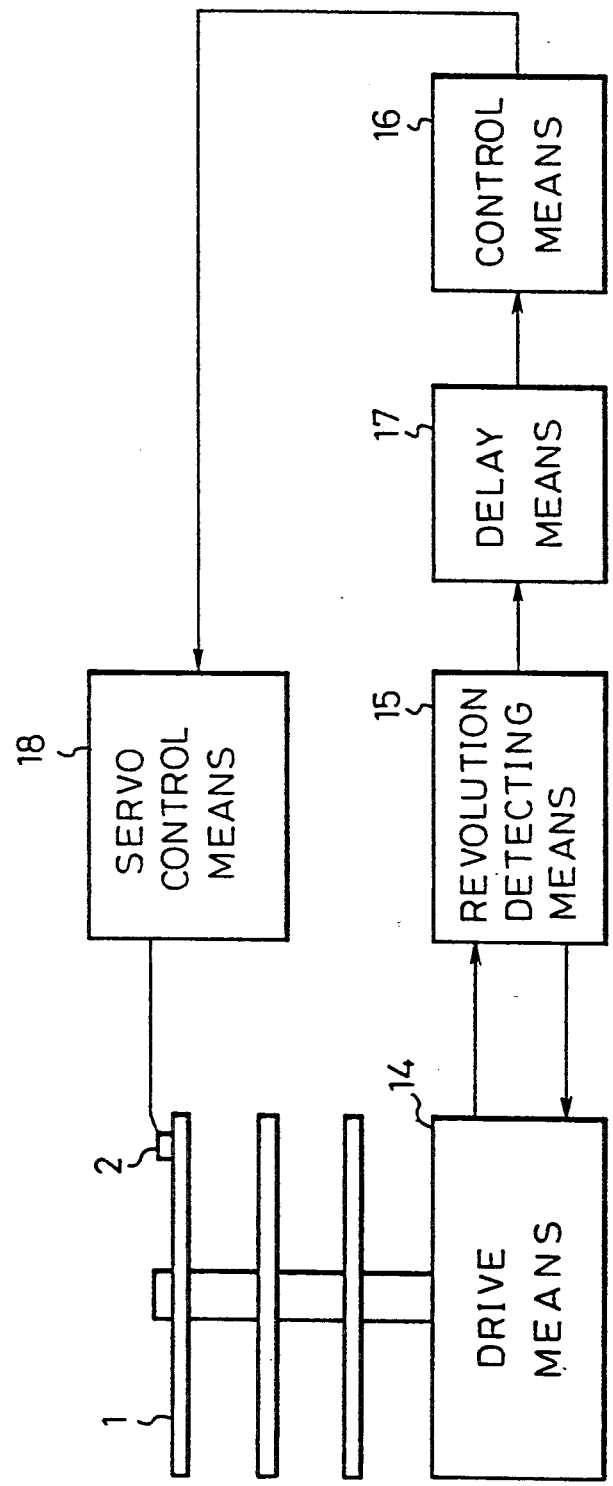
FIG. 2 is a schematic block diagram showing a disk drive unit according to the present invention.

FIG. 2 shows a schematic block diagram for explaining a principle of this invention.

When the power is turned ON, a drive means 14 rotates the disks 1, and a speed of rotation of the disks 1 is detected by a revolution detecting means 15 and the results thereof are supplied to the drive means 14. Accordingly, the drive means 14 rotates the disks 1 at a predetermined speed of rotation in accordance with the results of the detection by the revolution detecting means 13.

A head 2 reads servo information stored in the disk 1 and supplies the same to a servo control means 18, and the servo control means 18 positions the servo head 2 at a target cylinder in accordance with the servo information from the servo head 2.

A control means 16 receives a signal output by a delay means, to position the servo head 2 at a CSS area provided on the disk 1, after the speed of rotation of the disk 1 reaches a predetermined speed and before an initial seeking movement is started.

According to the operation of the above unit, after the speed of rotation of the disk 1 reaches the predetermined speed, and when the initial seeking movement is allowable, the servo head 2 is withdrawn to the CSS area so that the servo head 2 will not read noise when the initial seeking movement is underway, and thus the temperature of the disk drive unit can be lowered and the power consumption by the unit can be reduced.

Figure 3:
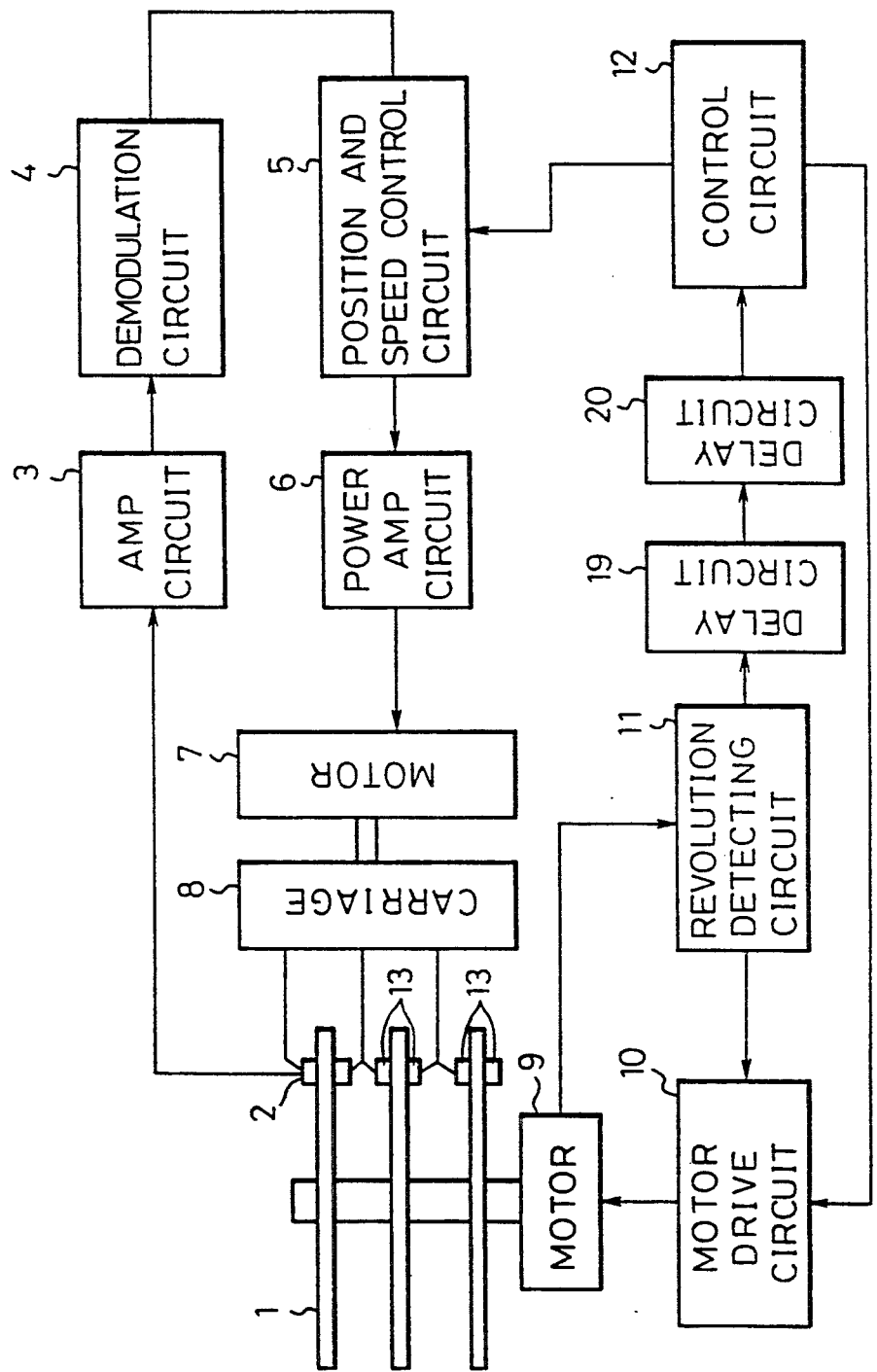
FIG. 3 is a block diagram showing a disk drive unit according to an embodiment of this invention.

An embodiment of the present invention is now explained with reference to FIG. 3 and FIG. 4. FIG. 3 is a block diagram of a disk drive unit according to this embodiment, and FIG. 4 is a time chart explaining an operation of the unit of FIG. 3. In FIG. 3, reference numbers identical to those used in FIG. 1 show elements having the same function as those of FIG. 1.

The unit shown in FIG. 3 comprises a plurality of disks 1, a servo head 2, an amplification circuit 3, a demodulation circuit 4, a position and speed control circuit 5, a power amplification circuit 6, a motor 7, a carriage 8, a motor 9, a motor drive circuit 10, a revolution detecting circuit 11, a control circuit 12, a plurality of data magnetic heads 13, and delay circuits 19 and 20.

When the power is supplied to the disk drive unit, as explained in FIG. 1, the motor 9 is supplied with an electric current by the motor drive circuit 10 and rotates the disks 1. The revolution detecting circuit 11 detects the speed of rotation of the motor 9, and a start signal is supplied to the delay circuit 19 when the speed of rotation reaches a predetermined speed, as shown in FIG. 4 (SPEED DET).

In this embodiment, timer devices 19 and 20 are used as the delay circuits 19 and 20. After the timer device 19 receives a start signal, as shown in FIG. 4 (1ST DELAY), the timer device 19 outputs a logical signal "1" to the timer device 20, and after a predetermined time, outputs a logical signal "0" to the timer device 20. The operation of the timer device 20 is started when the signal from the timer device 19 changes from "1" to "0", and at the same time, as shown in FIG. 4 (R/W ON), the prohibition of the operations of the magnetic heads and the servo head is released. Namely, the data magnetic heads are allowed to read or write data and the servo head to read the servo information.

When the disk 1 reaches the predetermined speed of rotation and the revolution detecting circuit 11 outputs the start signal to the timer device 19, the speed of rotation of the disk 1 is still increasing, due to the inertia thereof, and a certain time is needed to stabilize a predetermined rotation speed. The timer device 19 provides this certain time.

When operative, the timer device 20 outputs a signal "1" to the control circuit 12, which then positions the servo head 2 at the CSS area for a predetermined time, as shown in FIG. 4 (2ND DELAY).

Accordingly, the control circuit 12 outputs a signal showing that the servo head 2 is positioned at the CSS area, to the position and speed control circuit 5, during the time that the output of the timer device 20 is "1". The position and speed control circuit 5 then supplies an electric current for driving the carriage 8 to the motor 7 through the power amplification circuit 6 for the predetermined time of the count by the timer device 20, to move the servo head 2 to the inner side of the disk 1. Note, current materials used for coating the magnetic disk are very strong, and thus damage due to a contact therewith by the magnetic head in the data stored area has been eliminated.

In addition, the movement to the CSS area is carried out by moving the carriage 8 to a carriage stopper (not shown) provided in a range of movement of the carriage 8.

The control circuit 12 executes the initial seeking movement mode when the output of the timer device 20 changes from "1" to "0", as shown in FIG. 4 (INITIAL SEEKING MODE), and causes the position and speed control circuit 5 to carry out an initial seeking movement to thereby position the servo head 2 at the 0 cylinder at the outer side of the disk 1, as explained in FIG. 1.

As mentioned above, in the disk drive unit, since the data is read from the disk 1 after the speed of rotation of the disk 1 becomes stabilized, only the movement to the CSS area just before the initial seeking movement is accomplished without reading noise, and thus a wasteful consumption of power is avoided.

In this embodiment, the timer devices 19 and 20 are used as delay circuits, but monostable multivibrators can be used instead for this purpose. Further, a timer function utilizing software for instructing an operation of the control circuit 12 can be effected. Furthermore, a plurality of pulse series can be used for driving the motor 7.

As explained above, in this invention, an electric current is not supplied to the motor 7, which drives the carriage 8 to position the servo head 2 at the CSS area, from the time of a power ON to the point of the initial seeking movement at which the speed of rotation of the disk reaches a predetermined speed and is stabilized, but alternatively, an electric current can be supplied to the motor 7 just before the start of the initial seeking movement, whereby the power consumption is lowered and the temperature of the disk drive unit can be reduced. Particularly, in a portable microdisk drive unit wherein power is supplied by cells, the effect obtained by the lowering of the power consumption is remarkable.

I claim:

1. A disk drive unit comprising:
   at least one data magnetic head;
   a servo head driven by a same carriage as used for the at least one data magnetic head;
   a magnetic disk to which information is written by the at least one data magnetic head and from which information is read by the at least one data magnetic head and the servo head;
   a revolution detecting means for detecting a speed of rotation of the magnetic disk;
   a drive means for rotating the magnetic disk at a predetermined speed of rotation in response to results of a detection by said revolution detecting means;
   a servo control means for positioning the at least one data magnetic head at an arbitrary cylinder in response to servo information read by the servo head from the magnetic disk;
   a first delay means which is turned ON for a first predetermined time when the revolution detecting means detects a predetermined speed of rotation of the disk;
   a second delay means which is turned ON for a second predetermined time when the first delay means is turned OFF; and
   a control means for withdrawing the at least one data magnetic head and the servo head to evacuating areas provided on the magnetic disk during the time for which the second delay means is turned ON, for controlling the reading and writing operations by the at least one data magnetic head and the servo head when the second delay means is turned ON, and for positioning the at least one data magnetic head at one cylinder after the second delay means is turned OFF.

2. A disk drive unit as set forth in claim 1, wherein said servo control means comprises an amplification means for amplifying an output of the servo head, a demodulation means for demodulating an output of the amplification means, and a position and speed control means receiving an output of the control means and an output of the demodulation means for controlling the carriage.

3. A disk drive unit as set forth in claim 1, wherein the first and the second delay means are timer devices which are turned ON by input signals and turned OFF after respective predetermined times.

4. A disk drive unit as set forth in claim 1, wherein the first and the second delay means are monostable multivibrators which are turned ON by input signals and turned OFF after respective predetermined times.

5. A method of controlling a positioning of a magnetic head of a disk drive unit, comprising a revolution detecting means for detecting a speed of rotation of a magnetic disk, a drive means for rotating the magnetic disk at a predetermined speed of rotation in response to results of a detection by the revolution detecting means, a servo head for reading servo information stored in the magnetic disk, and a servo control means for positioning the servo head at an arbitrary cylinder in response to the servo information read by the servo head, the method comprising the steps of:

turning ON an output of a first delay means for a first predetermined time when a speed of rotation of the magnetic disk rotated by the drive means by turning a power supply ON reaches a predetermined speed of rotation;

turning ON an output of a second delay means for a second predetermined time when the first delay means is turned OFF;

withdrawing the servo head to an evacuating area provided on the magnetic disk during the time for which the output of the second delay means is turned ON;

reading the servo information by the servo head; and positioning the servo head at an arbitrary cylinder after the output of the second delay means is turned OFF.

6. A disk drive unit comprising:

at least one data reading means for reading data;

a means for reading servo information, driven by a same carriage as used for the at least one data reading means;

a magnetic disk to which data and servo information is written;

a revolution detecting means for detecting a speed of rotation of the magnetic disk;

a drive means for rotating the magnetic disk at a predetermined speed of rotation in response to results of a detection by said revolution detecting means;

a servo control means for positioning the at least one data reading means at an arbitrary cylinder in response to servo information read by the means for reading servo information from the magnetic disk;

a first delay means which is turned ON for a first predetermined time when the revolution detecting means detects a predetermined speed of rotation of the disk;

a second delay means which is turned ON for a second predetermined time when the first delay means is turned OFF; and a control means for withdrawing the at least one data reading means and the means for reading servo information to evacuating areas provided on the magnetic disk during the time for which the second delay means is turned ON, for controlling the reading and writing operations by the at least one data reading means and the means for reading servo information when the second delay means is turned ON, and for positioning the at least one data reading means at one cylinder after the second delay means is turned OFF.

* * * * *